United States Patent
Menjak et al.

(10) Patent No.: US 6,619,444 B2
(45) Date of Patent: Sep. 16, 2003

(54) MAGNETORHEOLOGICAL FLUID STOPPER AT ELECTRIC MOTOR

(75) Inventors: Ratko Menjak, Frankenmuth, MI (US); James Myrl Card, Linwood, MI (US); Stephen Vincent Gillman, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/825,793

(22) Filed: Apr. 4, 2001

(65) Prior Publication Data

US 2002/0144871 A1 Oct. 10, 2002

(51) Int. Cl.[7] .................................................. F16F 9/53
(52) U.S. Cl. ...................... 188/267.2; 188/162; 188/164
(58) Field of Search ..................... 188/1.11 E, 267.2, 188/266.3, 290, 157, 162, 164, 171, 404, 444; 310/92, 93, 94

(56) References Cited

U.S. PATENT DOCUMENTS

| | | | |
|---|---|---|---|
| 4,771,846 A | * 9/1988 | Venable et al. | 180/142 |
| 4,789,040 A | * 12/1988 | Morishita et al. | 180/446 |
| 4,871,039 A | * 10/1989 | Daido et al. | 180/446 |
| 4,893,688 A | * 1/1990 | Morishita | 180/445 |
| 4,934,473 A | * 6/1990 | Fushimi et al. | 180/79.1 |
| 5,230,397 A | * 7/1993 | Tranchon | 180/79.1 |
| 5,460,585 A | * 10/1995 | Gentry et al. | 482/1 |
| 5,492,312 A | * 2/1996 | Carlson | 267/140.14 |
| 5,667,715 A | 9/1997 | Foister | 252/65.52 |
| 5,711,746 A | * 1/1998 | Carlson | 482/112 |
| 5,719,766 A | * 2/1998 | Bolourchi et al. | 701/42 |
| 5,829,319 A | 11/1998 | Mokeddem | 74/574 |
| 5,842,547 A | * 12/1998 | Carlson et al. | 188/267 |
| 5,878,997 A | 3/1999 | Miesner | 267/140.14 |
| 5,896,965 A | 4/1999 | Gopalswamy et al. | 192/21.5 |
| 5,944,151 A | * 8/1999 | Jakobs et al. | 188/267.1 |
| 6,019,201 A | 2/2000 | Gordaninejad et al. | 188/267.1 |
| 6,122,579 A | * 9/2000 | Collier-Hallman et al. | 701/41 |
| 6,149,832 A | 11/2000 | Foister | 252/62.52 |
| 6,158,470 A | 12/2000 | Ivers et al. | 137/807 |
| 6,186,290 B1 | * 2/2001 | Carlson | 188/164 |
| 6,283,859 B1 | * 9/2001 | Carlson et al. | 463/36 |
| 6,302,249 B1 | * 10/2001 | Jolly et al. | 188/269 |
| 6,339,419 B1 | * 1/2002 | Jolly et al. | 345/156 |
| 2002/0108804 A1 | * 8/2002 | Park et al. | 180/444 |

FOREIGN PATENT DOCUMENTS

| | | |
|---|---|---|
| DE | 10 58 320 | 5/1959 |
| EP | 0 356 145 | 2/1990 |
| FR | 2 248 741 | 5/1975 |

* cited by examiner

Primary Examiner—Christopher P. Schwartz
Assistant Examiner—Xuan Lan Nguyen
(74) Attorney, Agent, or Firm—Michael D. Smith

(57) ABSTRACT

A motor system includes an electric motor, a shaft extending through the motor and through a magnetorheological fluid stopper, which comprises a rotor and a stator in operable communication with the rotor. A magnetorheological fluid is disposed at the rotor and the stator.

9 Claims, 3 Drawing Sheets

MAGNETORHEOLOGICAL FLUID STOPPER AT ELECTRIC MOTOR

BACKGROUND

An electric motor operates by rotation of a rotor relative to a stator in response to a magnetic field generated in the stator or rotor depending on the type of motor. During a period of time when a motor is energized, a rotating rotor (for example) builds inertia. Upon deactivation of the motor, the magnetic field impetus for the rotation of the rotor collapses but the inertia developed is still present. Thus, the rotor, although slowing, continues to rotate for a short period of time.

By way of example, electric motors are used to power electric power steering (EPS) systems. In that situation, the driver of a vehicle will turn a hand wheel of a vehicle. A torque sensor detects the rotation and sends a signal to a control, which then sends a signal to an electric motor to turn on. When the electric motor begins operation, it will rotate a gear mechanism, which rotates a shaft, ultimately steering road wheels of a vehicle and thereby assisting the driver with turning the vehicle. When the driver stops steering the vehicle, the torque sensor will again send a signal to the electric motor to deactivate, thereby deactivating the EPS system. As explained above, when the motor has been deactivated, the inertia forces of the rotating rotor continue to rotate the rotor, which will continue to rotate the gear mechanism, ultimately steering the road wheels until the rotor has completely stopped moving.

SUMMARY

Disclosed herein is a motor system including an electric motor, a shaft extending through the motor and through a magnetorheological (MR) fluid stopper, the MR fluid stopper comprising a rotor and a stator, wherein the stator is in operable communication with the rotor. In addition, an MR fluid is disposed at the rotor and the stator.

The above-described and other features and advantages of the present disclosure will be appreciated and understood by those skilled in the art from the following detailed description, drawings, and appended claims.

BRIEF DESCRIPTION OF THE DRAWINGS

Referring now to the drawings wherein like elements are numbered alike in the several Figures.

DETAILED DESCRIPTION

It must first be noted that a MR fluid stopper can be mounted on any type of motor. The functionality of the MR fluid stopper is the same regardless of the type of motor or the application. For this reason, the following description can be applied by one of ordinary skill in the art to any motor. For illustrative purposes, discussion of the MR fluid stopper vis-a-vis an EPS system has been selected.

Figure 1:
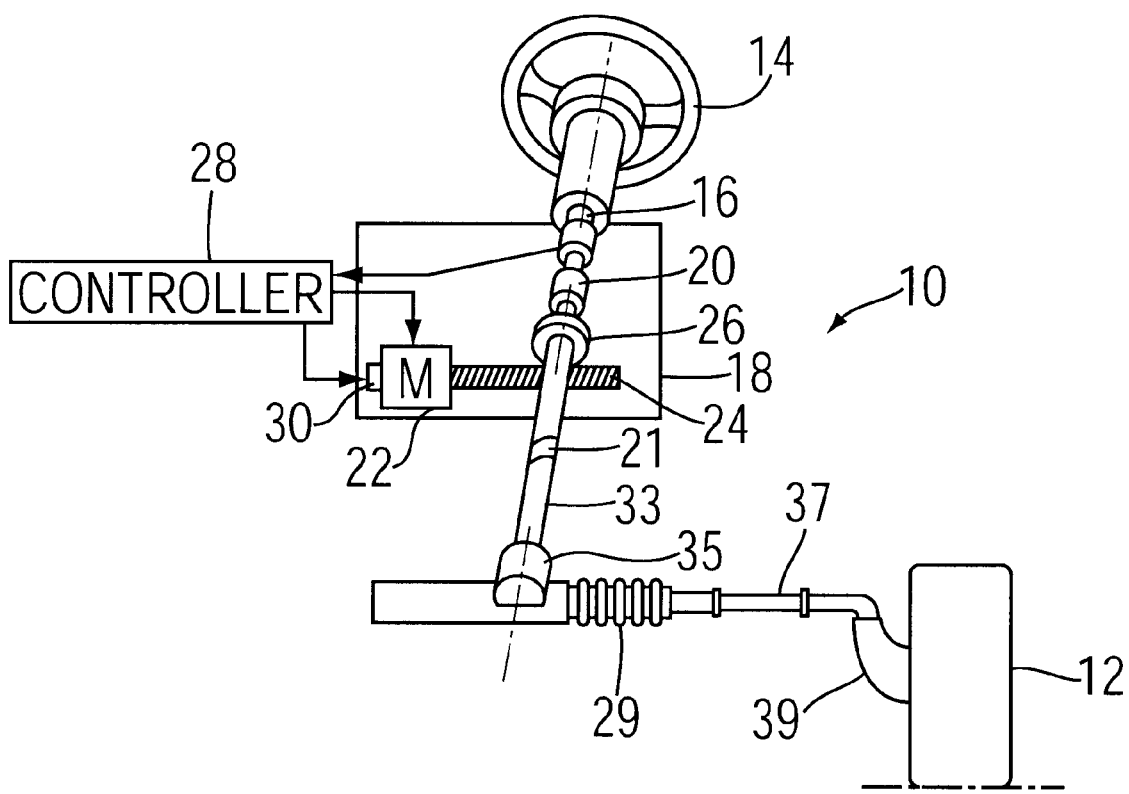
FIG. 1 is a schematic perspective view of a steering system of a vehicle.

Referring to FIG. 1, a steering system 10 of a vehicle is shown generally. Steering system 10 alters the direction of travel of the motor vehicle (not shown) by changing the position of road wheels 12 (only one shown) while the motor vehicle (not shown) is moving. Steering system 10 comprises an EPS system, which is connected at a hand wheel 14 through a steering shaft 16 and an EPS housing 18. The EPS system provides the driver with assistance in steering road wheels 12 (only one shown).

The driver turns hand wheel 14, which is mechanically connected to a steering shaft 16. The rotational force of hand wheel 14 is transmitted to steering shaft 16, which is detected by a torque sensor 20 disposed at steering shaft 16. Torque sensor 20 measures the torque on steering shaft 16 and sends a signal to a controller 28. Controller 28 then sends a signal to a motor 22 to begin operation. Motor 22, which is in mechanical communication with a worm 24 and a worm gear 26, rotates worm 24 and worm gear 26, which provide turning assistance to steering shaft 16. As steering shaft 16 turns, an intermediate shaft 33, connected through a universal joint 21 rotates a pinion gear (not shown) located under a gear housing 35. Rotation of the pinion gear (not shown) moves a rack 29, which moves a tie rod 37. When tie rod 37 moves, it turns a steering knuckle 39, which steers road wheels 12 (only one shown).

Figure 2:
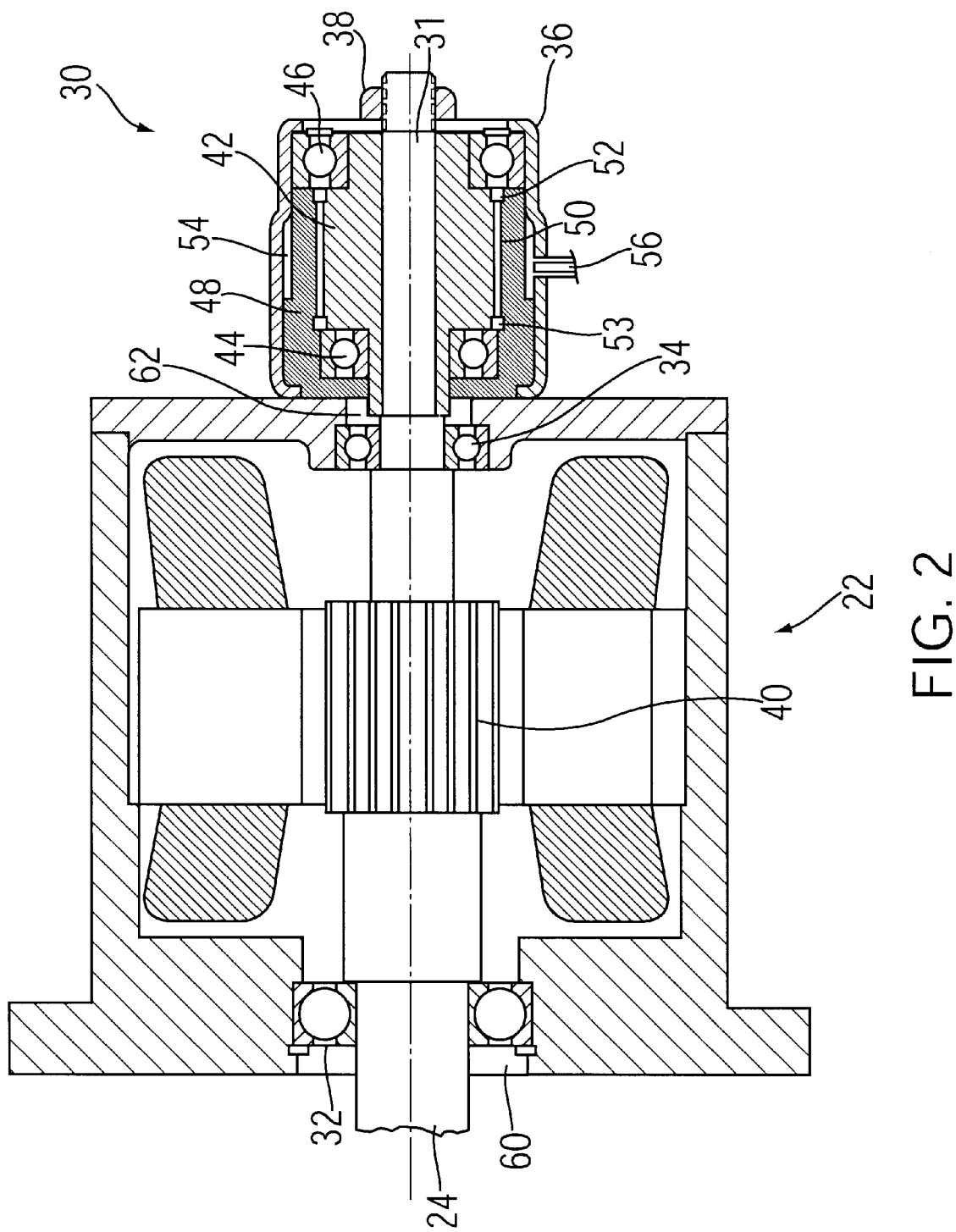
FIG. 2 is a cross-section view of an electric motor with a MR fluid stopper.
Figure 3:
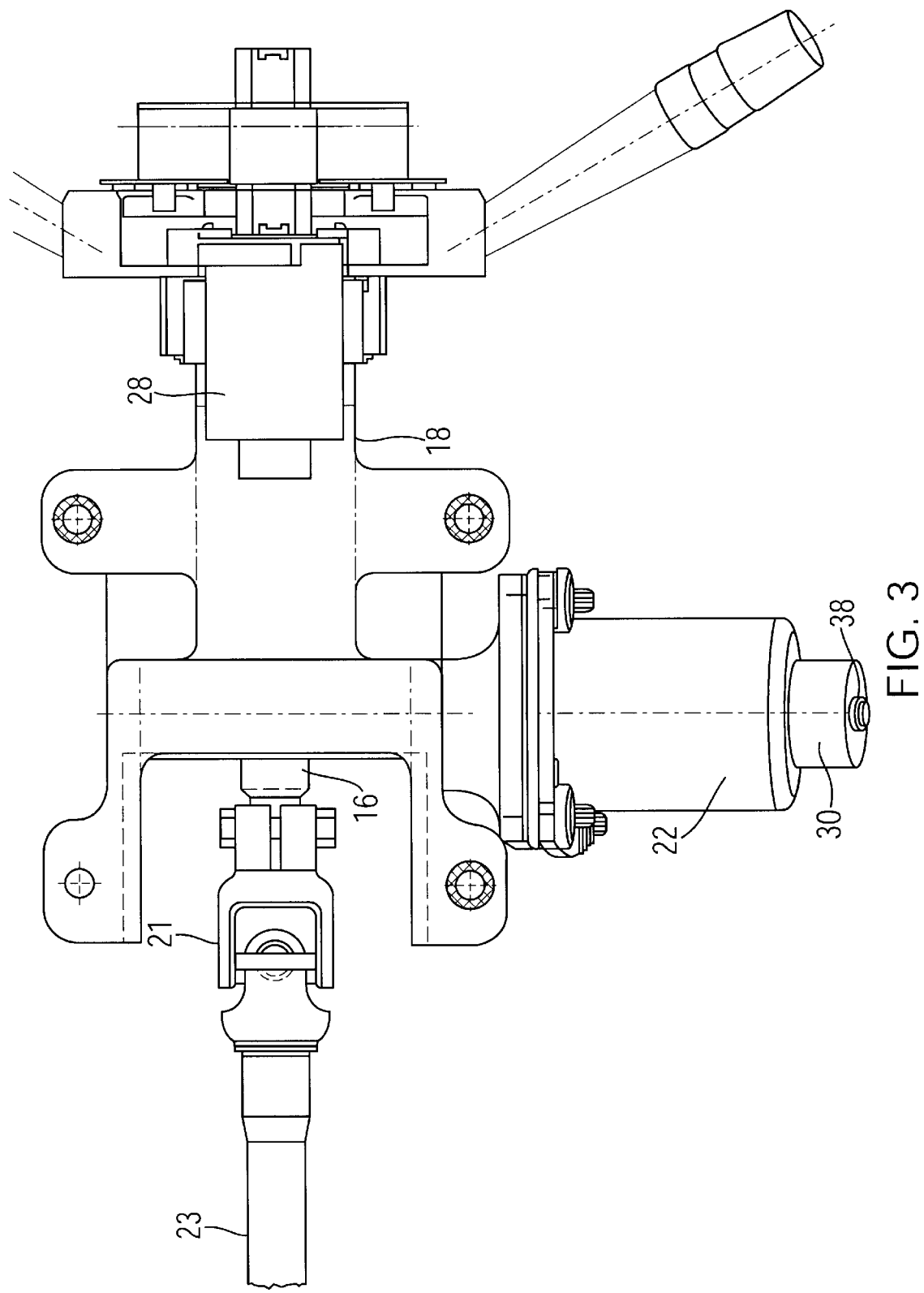
FIG. 3 is a cross-section view of an EPS mechanism with a MR fluid stopper.

Referring to FIGS. 2 and 3, worm 24 is in mechanical communication with motor 22. That mechanical communication may be accomplished by extending worm 24 to a motor's rotor 40 disposed at motor 22. A bearing 32, which supports worm 24, is disposed at worm 24 in a bearing recess 60.

Motor 22 is in operable communication with a MR fluid stopper 30. That operable communication may be accomplished by extending a shaft 31 from motor's rotor 40 to MR fluid stopper 30. Bearing 34, which supports shaft 31, is disposed at shaft 31 in a bearing recess 62. MR fluid stopper 30 is contained in a MR fluid stopper housing 36. Preferably, MR fluid stopper housing 36 is a ferrous material, but it can be any type of material. A nut 38 is disposed at the end of the shaft 31 at the MR fluid stopper housing 36.

MR fluid stopper 30 comprises a MR fluid stopper's rotor 42 in operable communication with a stator 48, with stator 48 disposed around MR fluid stopper's rotor 42. MR fluid stopper's rotor 42 is supported on either side by bearings 44, 46. Stator 48 is fixed to MR fluid stopper's housing 36. While FIG. 2 discloses stator 48 disposed around MR fluid stopper's rotor 42, one skilled in the art will understand that MR fluid stopper's rotor 42 may also be disposed around stator 48. In addition, MR fluid stopper's rotor 42 and stator 48 comprise ferrous material so that MR fluid stopper's rotor 42 and stator 48 may conduct a magnetic field. A MR fluid 50 is disposed at MR fluid stopper's rotor 42 and stator 48. MR fluid 50 is in contact with and disposed between both MR fluid stopper's rotor 42 and stator 48. MR fluid 50 is restrained by o-rings 52, 53. MR fluid 50 comprises a suspension of randomly arranged magnetically soft particles, e.g. carbonyl iron microspheres with chemically anchored surfactant, in a synthetic hydrocarbon or silicon based fluid. When MR fluid 50 is exposed to a magnetic field, the magnetically soft particles align and exhibit Bingham plastic rheological behavior.

In Bingham plastic rheological behavior, a linear relationship is maintained between the shear stress of the fluid and the shear rate of the fluid, as in Newtonian flow; however, in Bingham plastic rheological behavior, a finite shear stress is required to initiate the flow. In such a state, the shear stress of MR fluid 50 is equal to the yield stress of MR fluid 50 plus the product of the viscosity of MR fluid 50 and the shear rate of MR fluid 50. The yield stress is controlled by the application of the magnetic field to MR fluid 50. Moreover, yield stress is also known to increase as the volume fraction of the magnetically soft particles in the suspension is increased. Accordingly, a desired yield stress for a selected MR fluid can be achieved by controlling the volume fraction of suspended particles. MR fluid 50 contains about 30 percent to about 40 percent of magnetically soft particles. MR fluid 50 is more fully described by Foister, U.S. Pat. No. 5,667,715, "Magnetorheological Fluids," which is specifically incorporated in its entirety by reference herein.

Preferably, a coil 54, which may be created by electrical wires, is disposed around the outside of stator 48; however, any device that creates a magnetic field could replace coil 54. Coil 54 is in electronic communication with a controller 28 by a plug 56 disposed at MR fluid stopper 30. Both motor's rotor 40 and MR fluid stopper's rotor 42 are in operable communication with shaft 31. Motor's rotor 40, MR fluid stopper's rotor 42, and shaft 31 rotate together when motor 22 is operating.

Referring to FIGS. 1 through 3, when hand wheel 14 stops turning, controller 28 sends a signal to motor 22 to stop operating. However, the inertia of motor's rotor 40 tends to cause the same to continue to rotate after motor 22 has ceased operating. At the same time that controller 28 sends a signal to motor 22 to stop operating, controller 28 also sends a power signal to MR fluid stopper 30. The power signal transmits to coil 54 through plug 56. Coil 54 creates a magnetic field, which may be transmitted across the ferrous material of stator 48 and MR fluid stopper's rotor 42.

Referring to FIG. 2, when coil 54 creates the magnetic field, MR fluid 50, MR fluid stopper's rotor 42, and stator 48 are inside the magnetic field. When the magnetic field is created, the magnetically soft particles in the MR fluid 50 align or cluster and dramatically increase the effective viscosity or lower flowability of MR fluid 50. When MR fluid 50 has a high enough viscosity, MR fluid stopper's rotor 42 can no longer rotate, which causes both MR fluid stopper's rotor 42 and shaft 31 to stop rotating. When shaft 31 stops rotating, the stopped shaft 31 prevents motor's rotor 40 from rotating causing motor's rotor 40 to immediately stop rotating. Thus, when hand wheel 14 stops turning, MR fluid stopper will stop all movement in motor 22 within about 1 to about 2 milliseconds.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A motor system comprising:
    a motor, said motor being an electric motor, the electric motor having a first housing;
    a shaft extending through said motor and through a magnetorheological fluid stopper, said magnetorheological fluid stopper comprising;
        a rotor disposed at said shaft;
        a stator in operable communication with said rotor; and
        a magnetorheological fluid disposed at said rotor and said stator,
    the shaft extends through said first housing, said shaft being mounted on bearings supported by the first housing such that said shaft is rotatable on its axis with respect to said first housing, said motor causing said shaft to rotate in response to an input electric current;
    the magnetorheological fluid stopper is mounted on said shaft, said magnetorheological fluid stopper further comprising a second housing; said first and second housings being fixed with respect to one another, the magnetorheological fluid stopper being configured to resist rotation of the shaft upon receiving an electric signal; and
    further comprising a mechanical linkage placing said shaft in operable communication with a main shaft;
    wherein said main shaft is rotatably mounted in a main housing, said first housing being fixed to said main housing such that said main housing supports said first housing, said main shaft includes a torque sensor positioned between said mechanical linkage and a first end of said main shaft.

2. The motor system of claim 1 wherein said first end is adapted for attachment to a hand wheel, said shaft further comprising a second end adapted for engagement with a rack for steering road wheels of a vehicle.

3. The motor system of claim 1 further comprising an electronic controller mounted to said main housing, said electronic controller receiving signals from said torque sensor and producing output to said electric motor.

4. The motor system of claim 3 wherein said first end is adapted for attachment to a hand wheel.

5. A steering system for a vehicle comprising:
    a hand wheel positioned for operation by a driver;
    a steering linkage connecting said hand wheel to a pair of road wheels, said steering linkage comprising a steering column extending from said hand wheel to a pinion, said steering column including at least one shaft, a rack engaged with said pinion and mounted for linear movement, said rack connected via ball joints to a pair of tie rods extending to respective knuckles of respective road wheels;
    an electric motor having an output shaft;
    a transmission linking said electric motor to said steering linkage at a first location along said steering linkage;
    a torque sensor located on said steering column between said hand wheel and said first location, said torque sensor producing a torque signal indicative of a torque sustained by said steering column;
    a controller receiving said torque signal and generating a motor control signal that is received by said electric motor, said electric motor causing said output shaft in response to said motor control signal; and
    a magnetorheological fluid stopper mounted on said output shaft for stopping said output shaft in response to a stopper signal from said controller, said magnetorheological fluid stopper comprising:
        a rotor disposed on said output shaft;
        a stator in operable communication with said rotor, and
        a magnetorheological fluid disposed at said rotor and said stator.

6. The steering system of claim 5 wherein said electric motor, transmission, torque sensor, and magnetorheological fluid stopper are all mounted to a single housing.

7. The steering system of claim 6 wherein said housing is positioned at a top end of said steering column near the hand wheel.

8. The steering system of claim 5 wherein said magnetorheological fluid stopper is mounted on said output shaft on an opposite side of said electric motor as said transmission.

9. The steering system of claim 5 wherein said transmission comprises a worm on said output shaft that is in engagement with a worm gear on said steering column.

* * * * *